(12) United States Patent
Park et al.

(10) Patent No.: US 7,936,731 B2
(45) Date of Patent: May 3, 2011

(54) METHOD OF PROCESSING HARQ BY CONSIDERING MEASUREMENT GAP

(75) Inventors: Sung Jun Park, Anyang-si (KR); Seung June Yi, Anyang-si (KR); Young Dae Lee, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/382,303

(22) Filed: Mar. 12, 2009

(65) Prior Publication Data

US 2009/0235139 A1 Sep. 17, 2009

Related U.S. Application Data

(60) Provisional application No. 61/036,455, filed on Mar. 13, 2008, provisional application No. 61/039,095, filed on Mar. 24, 2008.

(30) Foreign Application Priority Data

Mar. 4, 2009 (KR) ........................ 10-2009-0018399

(51) Int. Cl.
*H04W 4/00* (2009.01)

(52) U.S. Cl. ........ 370/336; 370/215; 370/329; 370/468; 370/216; 370/342; 455/450; 455/452.2

(58) Field of Classification Search .................. 370/315, 370/336, 235, 329, 468, 216, 342; 455/450, 455/452.2
See application file for complete search history.

(56) References Cited

U.S. PATENT DOCUMENTS

| | | | |
|---|---|---|---|
| 3,119,097 A | 1/1964 | Tullos | |
| 3,418,629 A | 12/1968 | Chien | |
| 3,439,279 A | 4/1969 | Guanella | |
| 6,028,854 A | 2/2000 | Raith et al. | |
| 7,372,842 B2 | 5/2008 | Kim et al. | |
| 2003/0016698 A1 | 1/2003 | Chang et al. | |
| 2005/0135318 A1 | 6/2005 | Walton et al. | |
| 2005/0141436 A1 | 6/2005 | Dick et al. | |

(Continued)

FOREIGN PATENT DOCUMENTS

JP 2006-0087120 A 12/2007

(Continued)

OTHER PUBLICATIONS

Ericsson: "E-UTRAN Random Access procedure C-RNTI assignment and HARQ on message 4 with RACH model" 3GPP Draft; R2-070365, 3rd Generation Partnership Project (3GPP), vol. RAN WG2, XP050133443, Jan. 2007.

Ericsson: 3GPP Draft; R1-080898, 3rd Generation Partnership Project (3GPP), vol. RAN WG1, XP050109373, Feb. 2008.

LG Electronics Inc: "Allocation of a "short" CRNTI in msg2" 3GPP Draft; R2-081038 Short CRNTI, 3rd Generation Partnership Project (3GPP), vol. RAN WG2, XP050138828, Feb. 2008.

(Continued)

*Primary Examiner* — Pierre-Louis Desir

(74) *Attorney, Agent, or Firm* — McKenna Long & Aldridge LLP

(57) ABSTRACT

A HARQ processing method is disclosed, by which a measurement gap is considered. In particular, as a terminal performs an inter-measurement operation, if HARQ feedback information reception is impossible, the terminal determines HARQ feedback information, which is not received for a next HARQ operation, as ACK or NACK by itself and is then able to perform the next HARQ operation. Specifically, in case that the terminal operates by determining the non-received HARQ feedback information as ACK, a corresponding uplink signal keeps being stored in an HARQ buffer and can be retransmitted according to a new UL grant reception from a base station.

11 Claims, 8 Drawing Sheets

U.S. PATENT DOCUMENTS

| | | | |
|---|---|---|---|
| 2005/0221833 A1 | 10/2005 | Granzow et al. | |
| 2005/0287957 A1 | 12/2005 | Lee et al. | |
| 2006/0023629 A1 | 2/2006 | Kim et al. | |
| 2006/0062173 A1 | 3/2006 | Cheng et al. | |
| 2006/0251105 A1 | 11/2006 | Kim et al. | |
| 2006/0281417 A1 | 12/2006 | Umesh et al. | |
| 2007/0140178 A1 | 6/2007 | Jung et al. | |
| 2007/0189236 A1 | 8/2007 | Ranta-aho et al. | |
| 2007/0206531 A1 | 9/2007 | Pajukoski et al. | |
| 2007/0242764 A1 | 10/2007 | Anigstein et al. | |
| 2007/0248060 A1 | 10/2007 | Mooney et al. | |
| 2007/0258402 A1 | 11/2007 | Nakamata et al. | |
| 2007/0288824 A1 | 12/2007 | Yeo et al. | |
| 2007/0291719 A1 | 12/2007 | Demirhan et al. | |
| 2008/0005638 A1 | 1/2008 | Kuo et al. | |
| 2008/0192674 A1* | 8/2008 | Wang et al. | 370/315 |
| 2009/0041240 A1 | 2/2009 | Parkvall et al. | |
| 2009/0103500 A1 | 4/2009 | Malkamaki et al. | |
| 2009/0168731 A1* | 7/2009 | Zhang et al. | 370/336 |
| 2009/0245194 A1 | 10/2009 | Damnjanovic et al. | |
| 2009/0287976 A1 | 11/2009 | Wang et al. | |
| 2010/0067460 A1 | 3/2010 | Hu et al. | |

FOREIGN PATENT DOCUMENTS

| | | |
|---|---|---|
| KR | 10-2001-0110188 | 12/2001 |
| KR | 10-2001-0110188 A | 12/2001 |
| KR | 10-2003-0043426 A | 6/2003 |
| KR | 10-2005-0120189 | 12/2005 |
| KR | 10-2006-0067329 A | 6/2006 |
| KR | 10-2006-0131808 A | 12/2006 |
| KR | 10-2007-0026156 | 3/2007 |
| KR | 10-2007-0121505 A | 12/2007 |
| KR | 10-2008-0003682 A | 1/2008 |
| KR | 10-2008-0018105 A | 2/2008 |
| KR | 10-2007-0080544 A | 8/2008 |
| WO | WO 2005/125226 | 12/2005 |
| WO | WO 2007/091520 | 8/2007 |
| WO | WO 2007/148706 | 12/2007 |
| WO | WO 2009/020423 | 2/2009 |
| WO | WO 2009/045011 | 4/2009 |

OTHER PUBLICATIONS

Nokia Siemens Networks et al: "Way Forward on Scrambling Sequence Initialisation", 3GPP Draft; R1-081128_SCRAMBLING, 3rd Generation Partnership Project (3GPP), vol. RAN WG1, XP050109572, Feb. 2008.

LG Electronics Inc., "Scrambling of Message 3", 3GPP Draft; R2-082508, 3rd Generation Partnership Project(3GPP), vol. RAN WG2, XP050140189, May 2008.

Nokia Corporation et al., "On Resource Release in Enhanced UL for CELL_FACH", 3GPP Draft; R2-080272, Jan. 7, 2008.

NEC, "Comparison of HS-based E-RACH resource assignment", 3GPP Draft; R2-080128, Comparison of HS-Based E-Rach Resource Assignment, $3^{rd}$ Generation Partnership Project (3GPP), Jan. 9, 2008.

LG Electronics, "Load Management of E-DCH Resource Release", 3GPP TSG-RAN WG2 #61BIS, R2-081829, Mar. 31, 2008, p. 1-4.

Ericsson, "Back-off operation for enhanced uplink in CELL_FACH", 3GPP Draft, R2-081502_EUL_BACK_OFF, $3^{rd}$ Generation Partnership Project (3GPP), Mar. 25, 2008.

3GPP TS 36.321, V8.0.0, Medium Access Control Protocol Specification, Dec. 1, 2007, pp. 1-23, XP002521635.

LG Electronics: "HARQ Feedback and Measurement Gap", 3GPP Draft, R2-081602 HARQ Feedback and Measurement Gap_RO, $3^{rd}$ Generation Partnership Project (3GPP), RAN WG2, Mar. 25, 2008.

NTT Docomo et al.: "UL HARQ handling when P-HICH collides with measurement gap", 3GPP Draft, R2-081727, $3^{rd}$ Generation Partnership Project (3GPP), RAN WG2, Mar. 25, 2008.

Persson, F., "Voice over IP Realized for the 3GPP Long Term Evolution", Vehicular Technology Conference, IEEE $66^{th}$, 2007, pp. 1436-1440.

3GPP TS 36.300 V8.4.0: $3^{rd}$ Generation Partnership Project; Technical Specification Group Radio Access Network: Evolved Universal Terrestrial Radio Access (E-UTRA) and Evolved Universal Terrestrial Radio Access Network (E-UTRAN); Overall description; Stage 2 (Release 8); Mar. 17, 2008.

* cited by examiner

METHOD OF PROCESSING HARQ BY CONSIDERING MEASUREMENT GAP

CROSS REFERENCE TO RELATED APPLICATIONS

This application claims the benefit of the U.S. provisional Application Nos. 61/036,455 and 61/039,095, filed on Mar. 13, 2008 and Mar. 24, 2008, respectively, which are hereby incorporated by reference as if fully set forth herein.

This application claims the benefit of the Korean Patent Application No. 10-2009-0018399, filed on Mar. 4, 2009, which is hereby incorporated by reference as if fully set forth herein.

BACKGROUND OF THE INVENTION

1. Field of the Invention

The present invention relates to HARQ processing technology, and more particularly, to a HARQ operation method by considering a measurement gap. Although the present invention is suitable for a wide scope of applications, it is particularly suitable for solving a problem caused in case that a measurement gap of interrupting uplink/downlink transmission is overlapped with a timing point of receiving HARQ (hybrid automatic repeat request) feedback information in a mobile communication system.

2. Discussion of the Related Art

First of all, 3GPP LTE ($3^{rd}$ generation partnership project) long term evolution: hereinafter called 'LTE') communication system is schematically described as a mobile communication system to which the present invention is applicable.

FIG. 1 is a schematic diagram of E-UMTS network structure as an example of a mobile communication system.

Referring to FIG. 1, E-UMTS (evolved universal mobile telecommunications system) is the system having evolved from UMTS (universal mobile telecommunications system) and its basic standardization is ongoing by 3GPP. Generally, the E-UMTS can be called LTE system.

E-UMTS network can be mainly divided into E-TRAN 101 and CN 102 (core network). The E-UTRAN (evolved-UMTS terrestrial radio access network) 101 consists of a user equipment (hereinafter abbreviated UE) 103, a base station (hereinafter named eNode B or eNB) 104, and an access gateway (hereinafter abbreviated AG) 105 located at an end point of the network to be externally connected to an external network. The AG 105 can be divided into one part responsible for user traffic processing and the other part for processing control traffic. In this case, the AG for new user traffic processing and the AG for processing control traffic can communicate with each other using a new interface.

At least one cell can exist at one eNode B. Between eNode Bs, an interface for user or control traffic transmission is usable. And, the CN 102 can consist of a node for user registrations of the AG 105 and other UE 103. Moreover, an interface for discriminating the E-UTRAN 101 and the CN 102 is available.

Layers of a radio interface protocol between a user equipment and a network can be divided into L1 (first layer), L2 (second layer) and L3 (third layer) based on three lower layers of the open system interconnection (OSI) reference model widely known in the field of communication systems. A physical layer belonging to the first layer provides an information transfer service using a physical channel. A radio resource control (hereinafter abbreviated RRC) located on the third layer plays a role in controlling radio resources between the user equipment and the network. For this, the RRC layers exchange RRC messages between the user equipment and the network. The RRC layers can be distributed to network nodes including the eNode B 104, the AG 105 and the like. Moreover, the RRC layer can be provided to the eNode B 104 or the AG 105 only.

FIG. 2 and FIG. 3 are diagrams for structures of a radio interface protocol between a user equipment and UTRAN based on the 3GPP radio access network specifications.

Referring to FIG. 2 and FIG. 3, a radio interface protocol horizontally consists of a physical layer, a data link layer and a network layer. And, the radio interface protocol vertically consists of a user plane for data information transfer and a control plane for control signal delivery (signaling). In particular, FIG. 2 shows the respective layers of the radio protocol control plane and FIG. 3 shows the respective layers of the radio protocol user plane. The radio protocol layers shown in FIG. 2 and FIG. 3 can be divided into L1 (first layer), L2 (second layer) and L3 (third layer) based on three lower layers of the open system interconnection (OSI) reference model widely known in the field of communication systems.

The respective layers of the radio protocol control plane shown in FIG. 2 and the respective layers of the radio protocol user plane shown in FIG. 3 are explained as follows.

First of all, a physical (PHY) layer of a first layer provides an upper layer with an information transfer service using a physical channel. The physical (PHY) layer is connected to a medium access control (MAC) layer on an upper layer via a transport channel. And, data is transported between the medium access control (MAC) layer and the physical (PHY) layer via the transport channel. In this case, the transport channel can be classified into a dedicated transport channel or a common transport channel according to whether a channel is shared or not. Moreover, data are transported via the physical channel between different physical layers, i.e., between a physical layer of a transmitting side and a physical layer of a receiving side.

Various layers exist in the second layer. First of all, a medium access control (hereinafter abbreviated 'MAC') layer plays a role in mapping various logical channels to various transport channels. And, the MAC layer also plays a role as logical channel multiplexing in mapping several logical channels to one transport channel. The MAC layer is connected to a radio link control (RLC) layer of an upper layer via a logical channel. And, the logical channel can be mainly categorized into a control channel for transferring information of a control plane and a traffic channel for transferring information of a user plane according to a type of the transferred information.

A radio link control (hereinafter abbreviated RLC) of the second layer performs segmentation and concatenation on data received from an upper layer to play a role in adjusting a size of the data to be suitable for a lower layer to transfer the data to a radio section. And, the RLC layer provides three kinds of RLC modes including a transparent mode (hereinafter abbreviated TM), an unacknowledged mode (hereinafter abbreviated UM) and an acknowledged mode (hereinafter abbreviated AM) to secure various kinds of QoS demanded by each radio bearer (hereinafter abbreviated RB). In particular, the AM RLC performs a retransmission function through automatic repeat and request (ARQ) for the reliable data transfer.

A packet data convergence protocol (hereinafter abbreviated PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE system, the PDCP layer performs a security function as well. This consists of ciphering for preventing data interception conducted by a third party and integrity protection for preventing data manipulation conducted by a third party.

A radio resource control (hereinafter abbreviated RRC) layer located at a most upper part of a third layer is defined in the control plane only and is responsible for controlling a logical channel, a transport channel and physical channels in association with configuration, reconfiguration and release of radio bearers (hereinafter abbreviated RBs). In this case, the RB means a logical path provided by the first and second layers of the radio protocol for the data delivery between the user equipment and the UTRAN. Generally, configuring an RB means to stipulate characteristics of radio protocol layers and channels required for providing a specific service and also means to configure detailed parameters and operational methods thereof. The RB can be classified into a signaling RB (SRB) or a data RB DRB). The SRB is used as a path for sending an RRC message in a control plane (C-plane) and the DRB is used as a path for transferring user data in a user plane (U-plane).

As a downlink transport channel for transporting data to a user equipment from a network, there is a broadcast channel (BCH) for transmitting system information and a downlink shared channel (SCH) for transmitting a user traffic or a control message. Downlink multicast, traffic of a broadcast service or a control message can be transmitted on downlink SCH or a separate downlink MCH (multicast channel). Meanwhile, as an uplink transport channel for transmitting data to a network from a user equipment, there is a random access channel (RACH) for transmitting an initial control message or an uplink shared channel (SCH) for transmitting user traffic or a control message.

As a downlink physical channel for transmitting information transferred on a downlink transport channel to a radio section between a network and a user equipment, there is a physical broadcast channel for transferring information of BCH, a physical multicast channel (PMCH) for transmitting information of MCH, a physical downlink shared channel for transmitting information of PCH and downlink SCH or a physical downlink control (or called DL L1/L2 control channel) for transmitting control information provided by first and second layers.

As an uplink physical channel for transmitting information forwarded on an uplink transport channel to a radio section between a network and a user equipment, there is a physical uplink shared channel (PUSCH) for transmitting information of uplink SCH, a physical random access channel (PRACH) for transmitting RACH information or a physical uplink control channel (PUCCH) for transmitting such control information, which is provided by first and second layers, as HARQ ACK, HARQ NACK, scheduling request (SR), channel quality indicator (CQI) report and the like.

Based on the above description, HARQ processing performed in the LTE system is schematically explained as follows.

FIG. 4 is a diagram for HARQ operation performed in the LTE system.

Referring to FIG. 4, a terminal (UE) is set to a transmitting side and a base station (eNode B or eNB) is set to a receiving side. Assume an uplink situation that HARQ feedback information is received from the base station. This is identically applicable to a downlink situation as well.

First of all, in order to enable a terminal to transmit data, a base station is able to transmit uplink scheduling information, i.e., uplink (UL) grant via PDCCH (physical downlink control channel) [S401]. In this case, the UL grant can include a terminal identifier (e.g., C-RNTI, semi-persistent scheduling C-RNTI), a location of an assigned radio resource (resource block assignment), a transmission parameter such as a modulation/coding rate, a redundancy version and the like, a new data indicator (NDI), etc.

The terminal is able to check UL grant information sent to itself by monitoring PDCCH each TTI (transmission time interval). In case of discovering the UL grant information sent to itself, the terminal is able to transmit data ('data 1 in FIG. 4) on PUSCH (physical uplink shared channel) according to the received UL grant information [S402]. In this case, the transmitted data can be transmitted by MAC (medium access control) PDU (protocol data unit).

As mentioned in the above description, after the terminal has performed the uplink transmission on PUSCH, it stands by for HARQ feedback information reception on PHICH (physical hybrid-ARQ indicator channel) from the base station. If HARQ NACK for the data 1 is transmitted from the base station [S403], the terminal retransmits the data 1 in a retransmission TTI of the data 1 [S404]. On the contrary, if HARQ ACK is received from the base station [not shown in the drawing], the terminal stops the HARQ retransmission of the data 1.

Each time the terminal performs one data transmission by HARQ scheme, the terminal takes a count of the number of transmissions (CURRENT_TX_NB). If the transmission number reaches a maximum transmission number (CURRENT_TX_NB) the terminal discards MAC PDU stored in HARQ buffer.

If HARQ ACK for the data 1 retransmitted in the step S404 from the terminal is received [S405] and if a UL grant is received on PDCCH [S406], the terminal is aware of whether data to be transmitted this time is an initially-transmitted MAC PDU and whether to retransmit a previous MAC PDU using a new data indicator (NDI) field received on PDCCH. In this case, the NDI field is a 1-bit field. The NDI field is toggled as 0→1→0→1→ . . . each time a new MAC PDU is transmitted. For the retransmission, the NDI field is set to a value equal to that of the previous transmission. In particular, the terminal is ware of whether to retransmit the MAC PDU by comparing the NDI filed is set to a previously-transmitted value.

In case of FIG. 4, as a value of 'NDI=0' in the step S401 is toggled into 'NDI=1' in the step S406, the terminal recognizes that the corresponding transmission is a new transmission. The terminal is then able to transmit data 2 on PUSCH [S407].

Meanwhile, in the LTE system, a base station is able to set up a measurement operation for a terminal which needs inter-measurement for mobility support. Thus, in a measurement gap for which the terminal performs the inter-measurement, a communication between the base station and the terminal is interrupted in general. In this case, the 'inter-measurement' includes intra-frequency measurement, an inter-frequency measurement, inter-RAT mobility measurement, etc. The 'inter-measurement' may be called as a 'measurement gap operation' if it does not cause any confusion.

The interval of the measurement gap may be determined according to a setup of the base station. As the measurement gap operation is performed each the determined interval, the terminal stops transmission to the base station in uplink for 6~7 ms and stops reception in downlink for 6 ms.

However, if the measurement gap coincides with the HARQ feedback reception timing, it is impossible for the terminal to receive the HARQ feedback from the base station.

SUMMARY OF THE INVENTION

Accordingly, the present invention is directed to a method of processing HARQ operation by considering a measurement gap that substantially obviates one or more problems due to limitations and disadvantages of the related art.

An object of the present invention is to provide an efficient HARQ processing method, which prepares for a case that a measurement gap for interrupting uplink/downlink transmission is overlapped with HARQ feedback information reception timing in a mobile communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for a HARQ (hybrid automatic repeat request) operation processed by a terminal in a mobile communication system, according to the present invention, includes the steps of receiving an uplink grant signal from a base station, transmitting a specific uplink signal to the base station based on the uplink grant signal, determining whether there is a measurement gap for the terminal not to perform at least one of uplink and downlink communications at a timing of receiving feedback information for the specific uplink signal transmission from the base station, and setting the feedback information to acknowledgement or non-acknowledgement by considering a result of the determination.

Preferably, when the measurement gap is set at the timing of receiving the feedback information as the result of the determination and the terminal is impossible to receive the feedback information, the feedback information is set to the acknowledgement.

More preferably, even when the terminal sets the feedback information to the acknowledgement, the terminal keeps the specific uplink signal in a HARQ buffer.

In this case, the method may further include the steps of receiving an additional uplink grant signal for the specific uplink signal from the base station and retransmitting the specific uplink signal which has been kept in the HARQ buffer from the terminal.

Preferably, the terminal performs at least one of an intra-frequency measurement, an inter-frequency measurement and an inter-RAT mobility measurement during the measurement gap.

Preferably, the HARQ process is assumed as a synchronous HARQ process.

In another aspect of the present invention, a terminal, which performs an HARQ (hybrid automatic repeat request) operation in a mobile communication system, includes a receiving module receiving an uplink grant signal from a base station, a transmitting module transmitting an uplink signal to the base station based on the uplink grant signal, a measurement module performing a measurement operation and not performing at least one of uplink and downlink transmissions during a prescribed measurement gap, and at least one HARQ process module configured to manage the HARQ operation of the terminal, wherein the at least one HARQ process module is configured to determine whether there is a measurement gap at a timing of receiving feedback information for a specific uplink signal transmission from the base station and to set the feedback information to acknowledgement or non-acknowledgement by considering a result of the determination.

Preferably, when the measurement gap is set at the timing of receiving the feedback information and if it is impossible to receive the feedback information via the relieving module as the result of the determination, the at least one HARQ process module is configured to set the feedback information to the acknowledgement.

More preferably, each of the at least one HARQ process module is associated with a HARQ buffer. When a specific HARQ process module among the at least one HARQ process module sets the feedback information to the acknowledgement, the specific HARQ process module is configured to keep the specific uplink signal in a specific HARQ buffer associated with the specific HARQ process module.

In this case, when the receiving module receives an additional uplink grant signal for the specific uplink signal transmission from the base station, the specific HARQ process module is configured to retransmit the specific uplink signal which has been kept in the specific HARQ buffer via the transmitting module.

Preferably, the transmitting module and the receiving module are included in a physical layer module, the at least one HARQ process module is included in a MAC (medium access control) layer, and the measurement module comprises at least one of a module in a RRC (radio resource control) layer module and a module in the physical layer module.

Accordingly, the present invention provides the following effects and/or advantages.

First of all, after a terminal has transmitted data to a base station using HARQ scheme, if a reception timing of HARQ feedback for the data transmission is overlapped with a measurement gap, the terminal is unable to receive the HARQ feedback. If so, the terminal sets up HARQ feedback information for the corresponding HARQ feedback by itself. Therefore, the terminal is able to normally perform a following HARQ operation.

Secondly, the method of the present invention is able to raise resource efficiency higher than the method of adjusting an HARQ feedback reception timing and a measurement gap not to be overlapped with each other.

Thirdly, even if a terminal operates in a manner of determining HARQ feedback information, which is not received by the terminal, as ACK by itself, a base station provides a means for enabling the terminal to initiate a retransmission for that specific transmission. Therefore, it is able to operate a system flexibly.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In the following detailed description of the invention includes details to help the full understanding of the present invention. Yet, it is apparent to those skilled in the art that the present invention can be implemented without these details. For instance, although the following detailed description is made in detail on the assumption that a mobile communication system is the 3GPP LTE system, it is applicable to other prescribed mobile communication systems by excluding unique items of the 3GPP LTE.

Occasionally, the structures and devices known to the public are omitted to avoid conceptional vagueness of the present invention or can be illustrated as block diagrams centering on their core functions.

Besides, in the following description, assume that a terminal is a generic term of such a mobile or fixed user-end device as a user equipment (UE), a mobile station (MS) and the like. Moreover, assume that a base station is a generic name of such a random node of a network end, which communicates with a terminal, as a Node B, an eNnode B and the like.

The problem, which is caused when the measurement gap and the HARQ feedback information reception timing are overlapped with each other, is explained in detail as follows.

Figure 1:
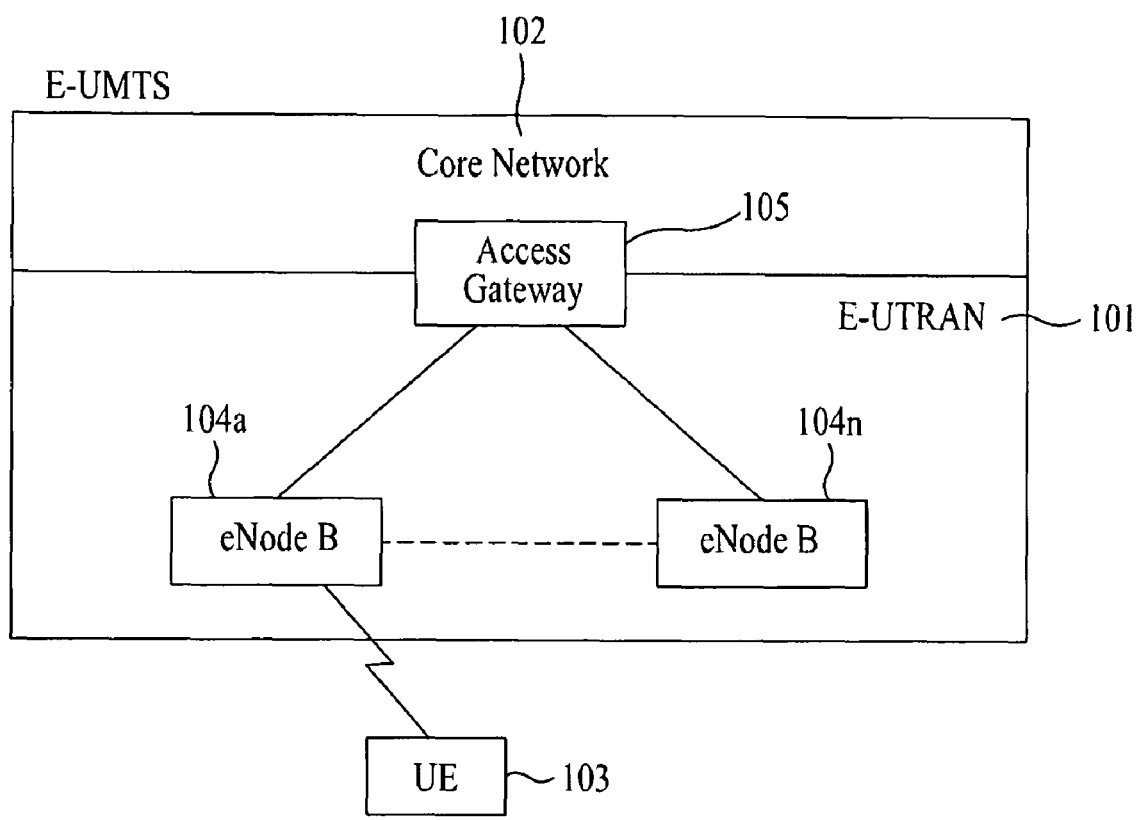
FIG. 1 is a schematic diagram of E-UMTS network structure as an example of a mobile communication system.
Figure 2:
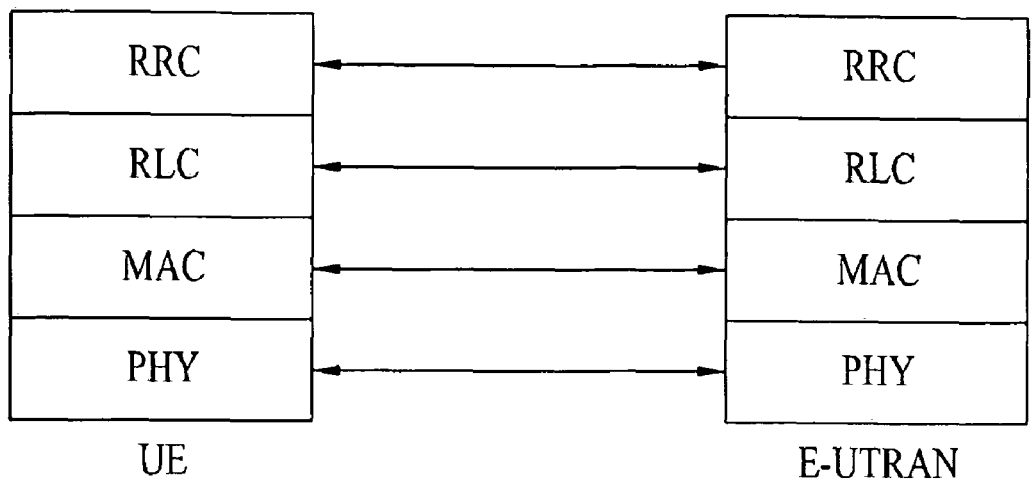
FIG. 2 and FIG. 3 are diagrams for structures of a radio interface protocol between a user equipment and UTRAN based on the 3GPP radio access network specifications.
Figure 3:
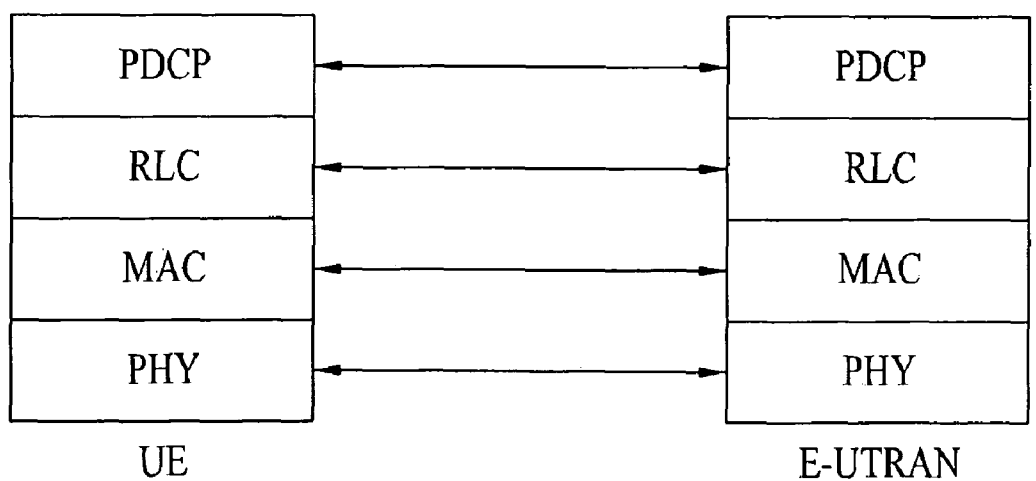
Figure 4:
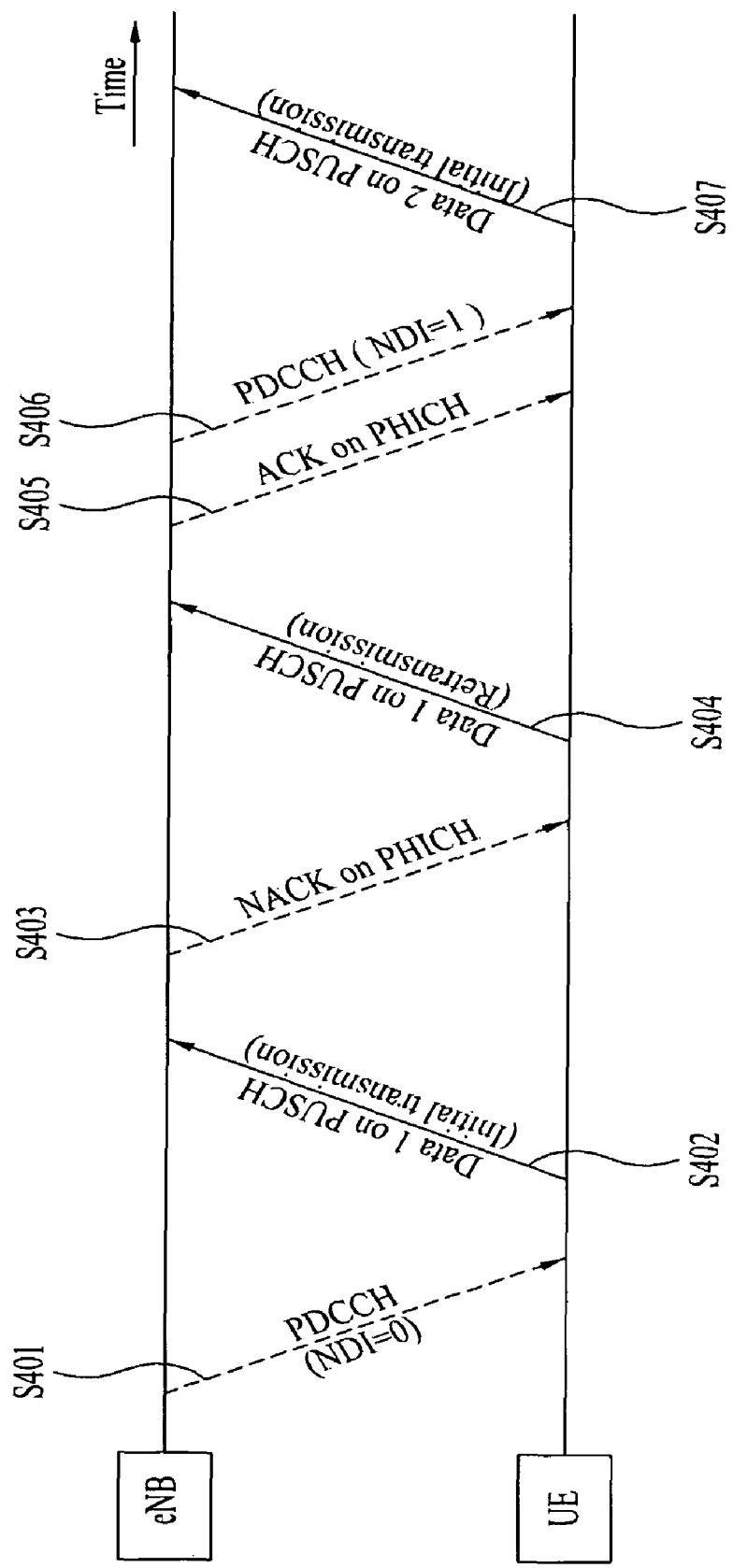
FIG. 4 is a diagram for HARQ operation performed in the LTE system.
Figure 5:
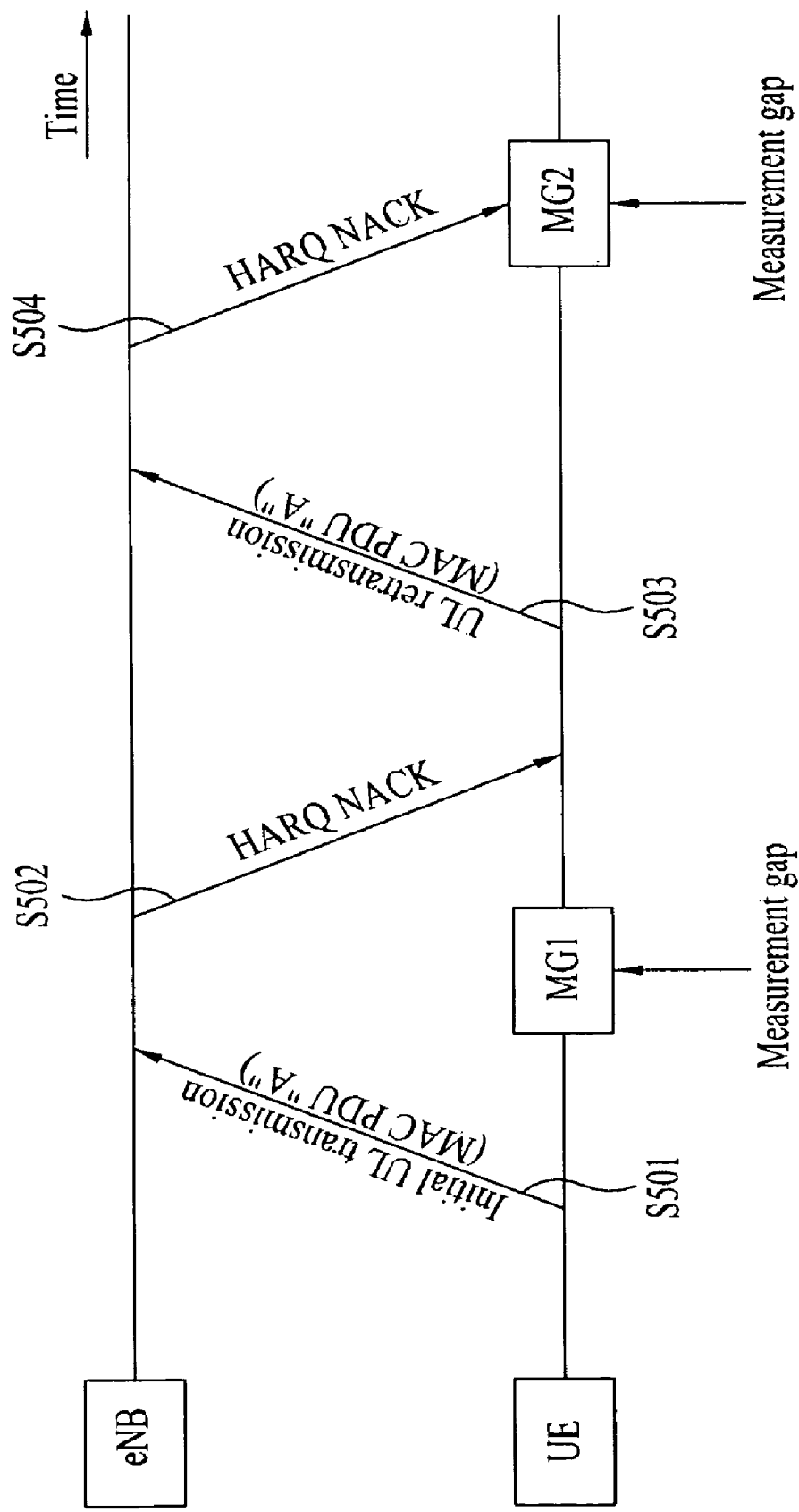
FIG. 5 is a diagram for explaining a problem occurring in case that a measurement gap and an HARQ feedback information reception timing are overlapped with each other.

FIG. 5 is a diagram for explaining a problem occurring in case that a measurement gap and HARQ feedback information reception timing are overlapped with each other.

Referring to FIG. 5, if a terminal receives a UL grant from a base station, the terminal generates a MAC PDU corresponding to the received UL grant, e.g., a MAC PDU A in the example shown in FIG. 5, and is then able to perform an initial transmission [S501]. Subsequently, the terminal is able to receive HARQ feedback information corresponding to the MAC PDU A transmission at the determined timing [S502]. Since HARQ operation is synchronously performed in the LTE system in general, the HARQ feedback information on the corresponding UL grant is received at the determined timing. If the terminal receives HARQ NACK from the base station in the step S502, the terminal is able to retransmit the corresponding MAC PDU A in a next period [S503]. In this case, assume the HARQ operation is performed non-adaptively. For instance, assume that the retransmission of the MAC PDU A in the step S503 is performed by the same scheme of the step S501 and through the same resource of the step S501 if there is no separate UL grant.

Meanwhile, if a system needs an inter-measurement, the base station is able to set up a measurement gap of a prescribed period for the terminal. The terminal is able to perform such an operation as an inter-frequency measurement, an intra-frequency measurement, an inter-radio system mobility (inter-RAT) measurement or the like in the set-up measurement gap.

In this case, the 'inter-frequency measurement' means a measurement operation at a frequency different from a downlink carrier frequency of a serving cell, whereas the 'intra-frequency measurement' means a measurement operation at the downlink carrier frequency of the serving cell. Moreover, the 'inter-radio system mobility measurement' includes an inter-radio system measurement at UTRA (universal terrestrial radio access) frequency, an inter-radio system measurement at GERAN (GSM/EDGE radio access network), an inter-radio system measurement at CDMA2000 HRPD (CDMA2000 high rate packet data) or CDMA2000 1xRTT (CDMA2000 1x radio transmission technology) frequency and the like.

The base station is able to set up the above-explained measurement gap in the terminal through an RRC (radio resource control) layer signal. And, the aforesaid measurement operation can be managed by an RRC layer module of the terminal. In FIG. 5, the terminal performs the above-mentioned measurement operation in a measurement gap 1 (MG1) of a predetermined period interval and a measurement gap 2 (MG2) of a predetermined period interval. Therefore, the terminal stops the uplink/downlink receptions in the measurement gaps 1 and 2.

If the timing of receiving the HARQ feedback information for the MAC PDU A retransmitted in the step S503 is overlapped with the measurement gap 2 in which the uplink/downlink reception of the terminal is impossible [S504], since the terminal is unable to receive an instruction from the base station, the terminal is unable to perform a next HARQ operation. Generally, HARQ operation of a terminal in the LTE system determines whether to perform a retransmission according to HARQ feedback reception from a base station. If feedback information from the base station fails to provide the determination of ACK or NACK, there is a problem that a connection to a next HARQ operation is disconnected.

Regarding the setup of the above-mentioned measurement gap, the measurement gap is set for a terminal via an RRC layer signal of a base station. And, HARQ transmission and retransmission timings are managed by the base station as well. Therefore, it may be able to consider a scheme for setting the HARQ feedback reception timing not to be overlapped with the measurement gap in advance by the base station. Yet, the HARQ feedback reception timing may vary according to how many times the retransmission by HARQ is performed. In case of allocating resources by considering all possibility that the measurement gap and the HARQ feedback information reception timing is overlapped, there is a problem the resource efficiency may be degraded.

According to one embodiment of the present invention, instead of enabling a base station to change the resource allocation scheme by considering the above mentioned problem, if a terminal is unable to receive an HARQ feedback from the base station due to the interruption of uplink/downlink transmission/reception such as the above-mentioned measurement operation, the terminal determines HARQ feedback information from the base station, which is not received from the base station, by itself and then performs next HARQ operations.

According to this embodiment, if the HARQ feedback reception timing is overlapped with the above-mentioned measurement gap, it is proposed that a terminal operates by determining the non-received HARQ feedback as HARQ NACK.

Figure 6:
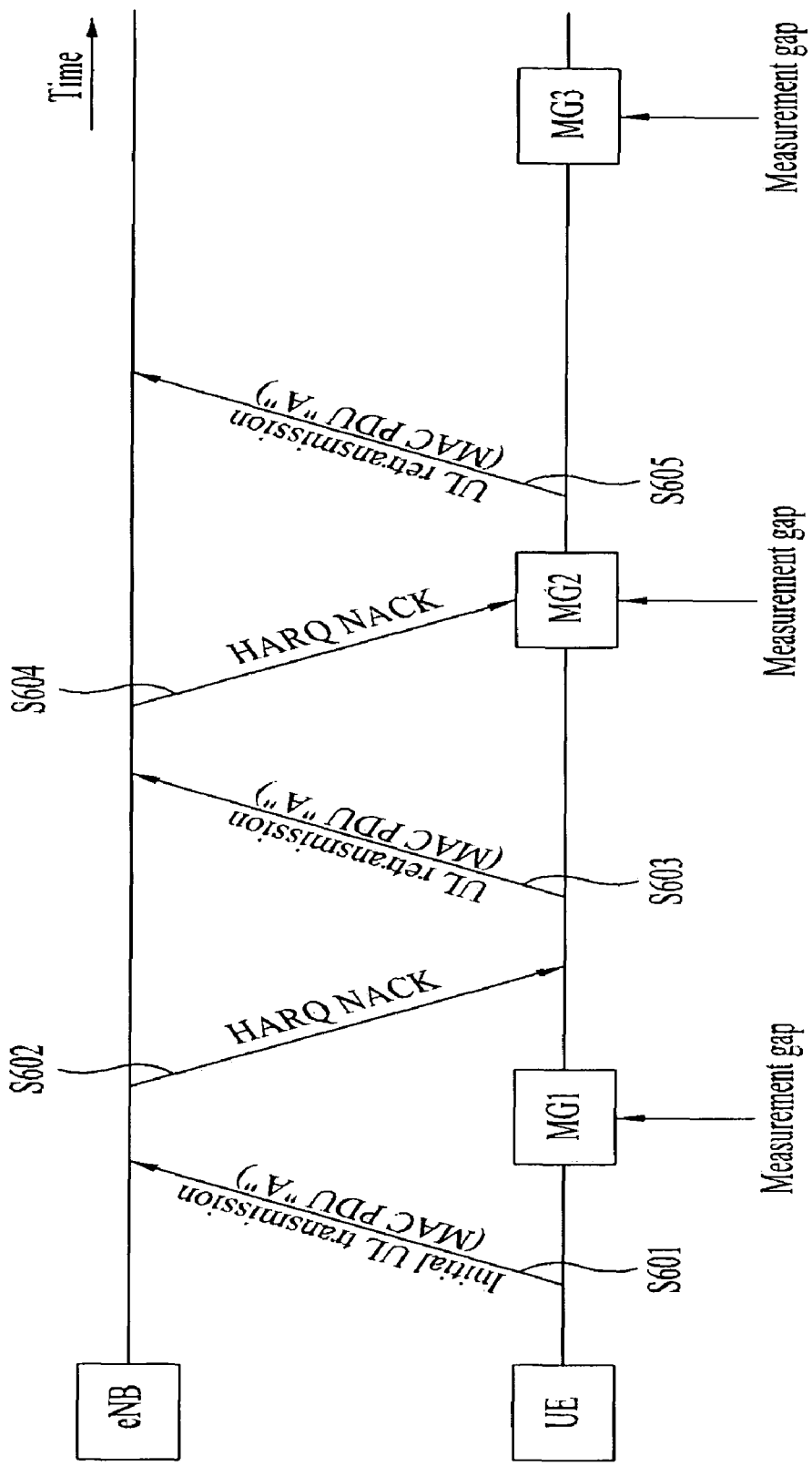
FIG. 6 is a diagram for explaining a scheme for a terminal to operate in a manner of determining a non-received HARQ feedback as HARQ NACK according to one embodiment of the present invention.

FIG. 6 is a diagram for explaining a scheme for a terminal to operate in a manner of determining a non-received HARQ feedback as HARQ NACK according to one embodiment of the present invention.

Referring to FIG. 6, a terminal generates MAC PDU A according to UL grant received from a base station and is then able to transmit the generated MAC PDU A on PUSCH [S601]. Besides, the base station is able to set such a measurement gap as a measurement gap 1 (MG1), a measurement gap 2 (MG2) and a measurement gap 3 (MG3), which are shown in FIG. 6, for the terminal via an RRC layer signal. Hence, an RRC layer module of the terminal stops uplink/downlink communications in the corresponding measurement gap and is then able to perform the above-described inter-measurement gap using a physical layer module.

After the terminal has transmitted the MAC PDU A, the terminal waits for HARQ feedback from the base station at in the determined timing. If the terminal receives HARQ NACK from the base station [S602], the terminal is able to try a retransmission of the MAC PDU A in the next retransmission timing, e.g., a next TTI [S603].

Meanwhile, if the timing of a reception of the HARQ feedback information for the MAC PDU A retransmitted in the step S603 is overlapped with the measurement gap 2 [S604], the terminal according to this embodiment regards the HARQ feedback information failing to be received from the base station as NACK and then proceeds with the next HARQ operation. In particular, the terminal is able to retransmit again the MAC PDU A in a next transmission TTI [S605].

In FIG. 6, shown is the example that the base station actually transmits HARQ NACK in the step S604. Yet, even if the base station actually transmits the HARQ ACK in the step S604, the terminal fails to receive the corresponding HARQ ACK. According to this embodiment, the terminal determines it as HARQ NACK and then performs the retransmission. Hence, although the base station receives again the MAC PDU A again after the successful reception of the MAC PDU A, the base station is able to ignore the repeatedly transmitted MAC PDU A through HARQ process ID or the like.

Meanwhile, according to another embodiment of the present invention, since the measurement gap coincides with the HARQ feedback information reception timing, as mentioned in the above description, if HARQ feedback information reception is impossible, a terminal determines the non-received HARQ feedback information as ACK and then performs the next HARQ operation.

Figure 7:
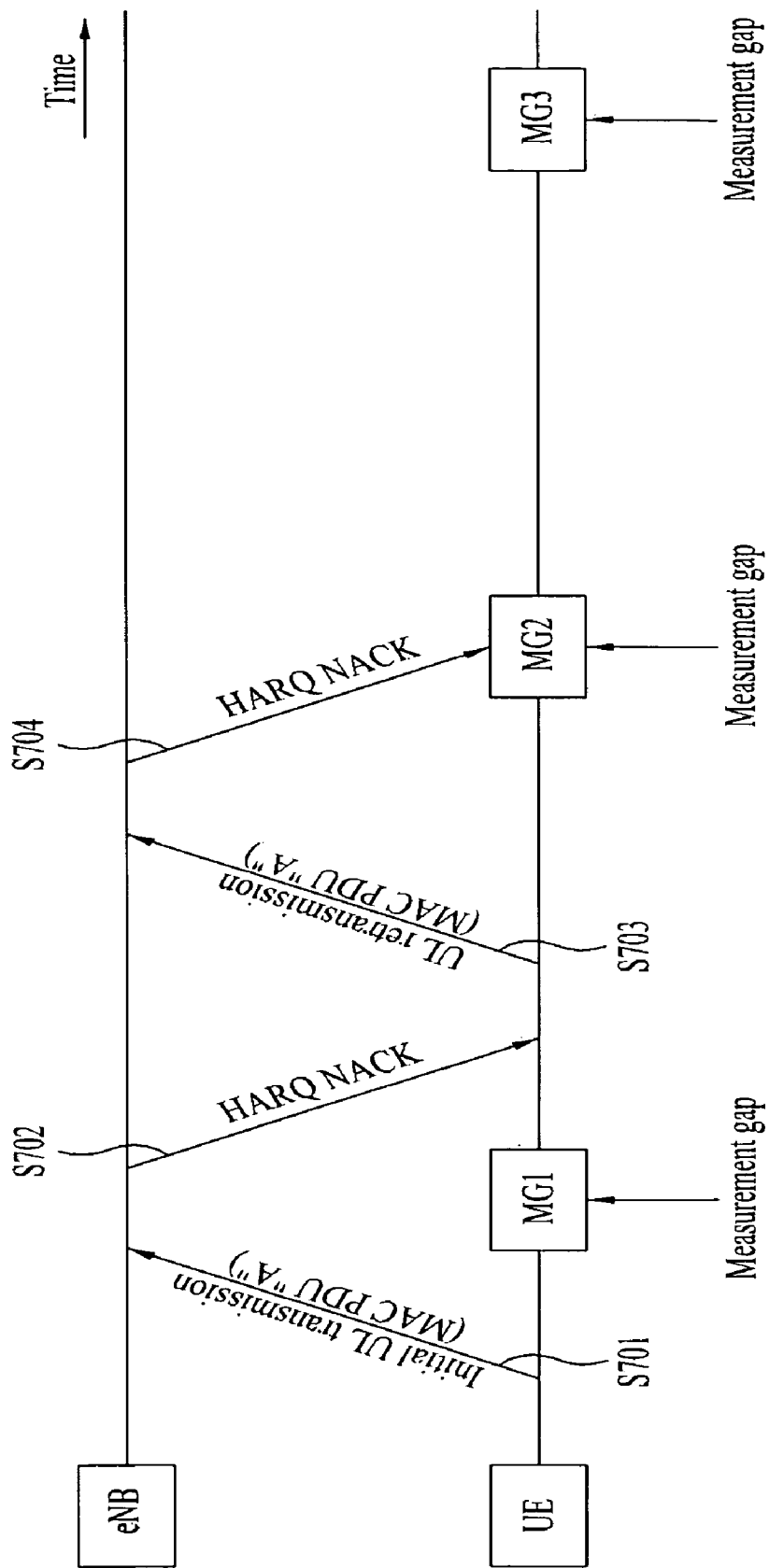
FIG. 7 is a diagram for explaining a scheme for a terminal to operate in a manner of determining a non-received HARQ feedback as ACK according to another embodiment of the present invention.

FIG. 7 is a diagram for explaining a scheme for a terminal to operate in a manner of determining a non-received HARQ feedback as ACK according to another embodiment of the present invention.

Referring to FIG. 7, a terminal generates MAC PDU A according to a received UL grant and is then able to transmit the generated MAC PDU A [S701]. Like the embodiment shown in FIG. 6, assume that such a measurement gap as a measurement gap 1 (MG1), a measurement gap 2 (MG2) and a measurement gap 3 (MG3) is set with a prescribed period via an RRC layer signal from a base station. Hence, an RRC layer module of the terminal performs an inter-measurement operation in the in the corresponding measurement gap and is then able to stop the uplink/downlink transmission and reception during the corresponding measurement gap.

The terminal is able to receive feedback information corresponding to the MAC PDU A transmitted in the step S701 from the base station at a predetermined timing [S702]. If the terminal receives HARQ NACK from the base station, the terminal is able to retransmit the MAC PDU A at a next transmission timing [S703].

As the timing of reception of HARQ feedback information on the MAC PDU A retransmitted in the step S703 is overlapped with the measurement gap 2, if the terminal is unable to received the HARQ feedback information from the base station, the terminal of the present embodiment regards the non-received HARQ feedback information as ACK and is then able to perform a next HARQ operation [S704]. In particular, since the measurement gap and the HARQ feedback information reception timing are overlapped with each other, if the HARQ feedback information reception from the base station is impossible, the terminal of the present embodiment stops the retransmission.

Meanwhile, when a retransmission of a terminal is impossible in the LTE system, even if a base station actually fails in a reception of data transmitted from the terminal, it is able to stop the retransmission of the terminal by transmitting HARQ ACK since the retransmission of a terminal is impossible. This concept can be called 'suspension'. The terminal's retransmission cancelled due to the suspension can be initiated again if the base station newly assigns a UL grant via PDCCH signaling.

Therefore, according to the embodiment of the present invention, as shown in FIG. 7, when a terminal regards HARQ feedback information, which is not received by the terminal because HARQ feedback information reception timing is overlapped with a measurement gap, as ACK and the terminal stops a retransmission, if a base station wants to make a request for a retransmission of a corresponding MAC PDU, the base station transmits a new UL grant. If so, the terminal sets the corresponding MAC PDU to be retransmitted.

Figure 8:
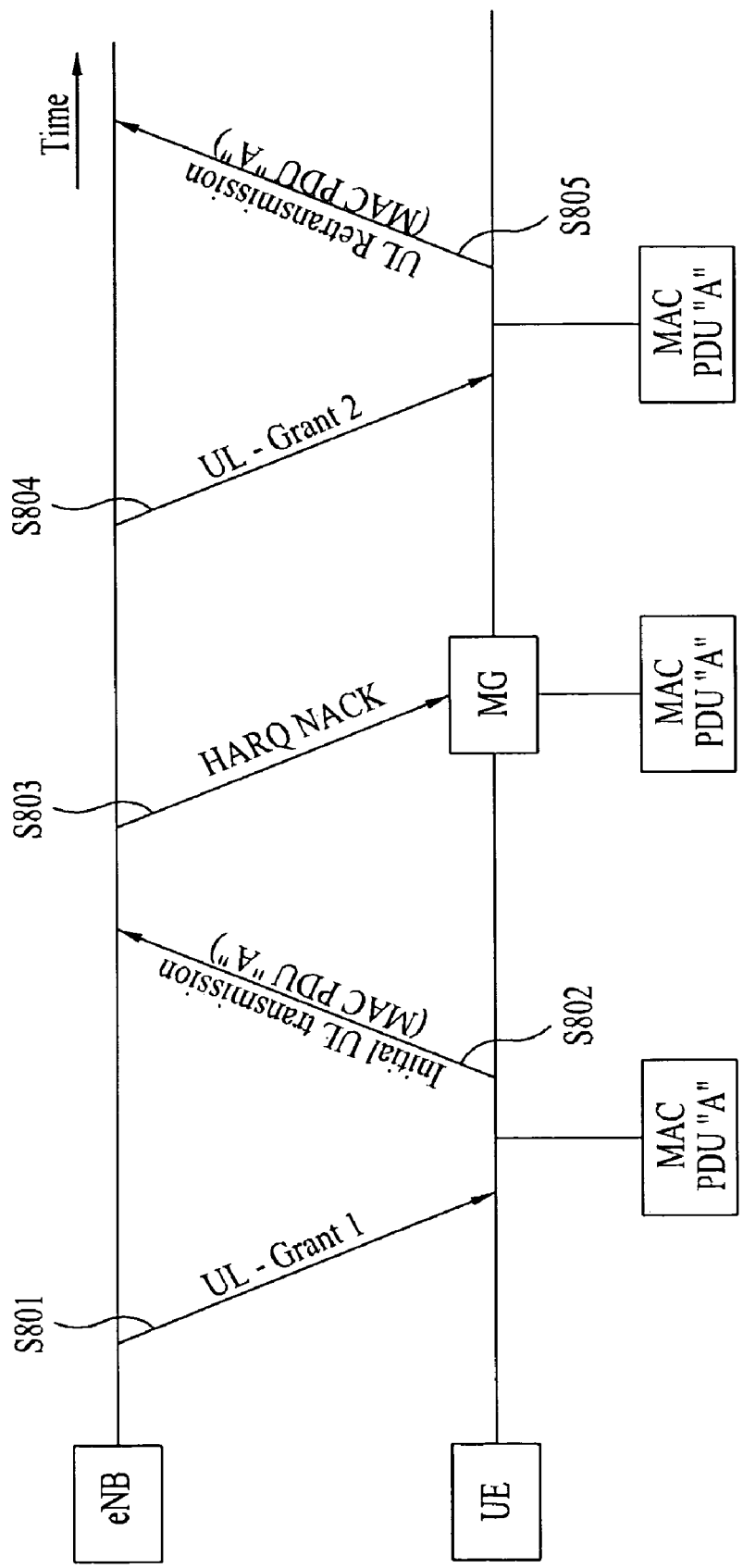
FIG. 8 is a diagram for a method of performing an HARQ operation in a terminal according to one preferred embodiment of the present invention.

FIG. 8 is a diagram for a method of performing an HARQ operation in a terminal according to one preferred embodiment of the present invention.

Referring to FIG. 8, in a step S801, a terminal determines that there exists PDSCH information transmitted to itself on PDCCH from a base station using a cell identifier (e.g., C-RNTI, etc.) and is then able to obtain UL grant information from the PDSCH information transmitted to itself. Having received the UL grant, the terminal generates a corresponding uplink transmission signal, e.g., MAC PDU A, and then stores it in an HARQ buffer.

In particular, the terminal is provided with a plurality of HARQ processes which operate synchronously. Namely, each of the HARQ processes is synchronously assigned each TTI. For instance, in the LTE system, assume that a terminal is provided with eight HARQ processes. And, the HARQ processes are assigned in the following manner. First of all, HARQ process #1 assigned in $1^{st}$ TTI, HARQ process #2 is assigned in $2^{nd}$ TTI, HARQ process #8 is assigned in $8^{th}$ TTI, the HARQ process #1 is assigned again in $9^{th}$ TTI, and the HARQ process #2 is assigned again in $10^{th}$ TTI and so on.

Since the HARQ processes are synchronously assigned, the HARQ process corresponding to the TTI, in which PDCCH for an initial transmission of specific data is received, is used for the transmission of the data. For instance, assume that a terminal receives PDCCH including UL scheduling information in an $N^{th}$ TTI and assume that the $N^{th}$ TTI corresponds to the HARQ process #K. When the terminal transmits data in $(N+4)^{th}$ TTI, it is able to use the HARQ process #K in the $(N+4)^{th}$ TTI for the data transmission.

Meanwhile, each of the HARQ processes has one HARQ buffer. Therefore, according to the UL grant received in the step S801, a specific HARQ process of the terminal generates MAC PDU A corresponding to the received UL grant and then stores it in its HARQ buffer. And, it is able to use the stored MAC PDU A for initial transmission and retransmission.

Subsequently, in a step S802, the terminal is able to initially transmit the MAC PDU A stored in the HARQ buffer. In particular, it is able to repeatedly retransmit the MAC PDU A by a prescribed count [not shown in the drawing], as described in the examples shown in FIG. 6 and FIG. 7. As mentioned in the foregoing description, the HARQ retransmission of a terminal in the LTE system is basically operative by a non-adaptive scheme. In particular, an initial transmission of specific data is possible only if PDCCH carrying UL grant information is received. Yet, the HARQ retransmission of the data is possible without PDCCH reception using the same UL grant to the initial transmission in the TTI having a next HARQ process assigned thereto.

Transmission parameters used for the initial transmission or retransmission are carried on PDCCH and corresponding information is variable according to a channel status. For instance, if a channel status is better than that of an initial transmission, it is able to transmit the information at a high bit rate by changing a size of modulation or payload. On the contrary, if the channel status is poor, the transmission can be performed at a bit rate lower than that of the initial transmission.

Subsequently, in a step S803, although the base station transmits HARQ NACK to the terminal in response to the MAC PDU A transmitted in the step S802, the terminal may not receive the HARQ NACK due to a preset measurement gap operation [S803]. In this case, according to the present invention, assume that the terminal performs a next HARQ operation by regarding non-received HARQ feedback information as HARQ ACK. Meanwhile, in the LTE system, even if a terminal transmits a specific MAC PDU to a base station and then receives HARQ ACK for the specific MAC PDU, assume that the terminal keeps the specific MAC PDU in an HARQ buffer unless the MAC PDU transmission count reaches a maximum retransmission count.

Therefore, in the example shown in FIG. 8, if the base station transmits a new UL grant to the terminal to make a request for a retransmission of the MAC PDU A [S804], the terminal is able to reinitiate the retransmission of the MAC PDU A stored in the corresponding HARQ buffer [S805].

Generally, if the HARQ feedback information reception timing and a measurement gap through RRC signaling are overlapped with each other, a terminal is unable to receive HARQ feedback information. However, regarding to a random access procedure, if a terminal operates by giving a priority to the random access procedure rather than the measurement operation, the terminal may be able to receive the HARQ feedback information despite that the HARQ feedback information reception timing and a measurement gap are overlapped with each other.

For instance, although the HARQ feedback information reception timing is overlapped with and a measurement gap, if the corresponding HARQ feedback information relates to a third message transmission in a random access procedure of a terminal, the terminal receives the HARQ feedback information irrespective of the measurement gap. This case that the terminal has no problem in the HARQ feedback information reception by not performing an actual measurement operation corresponds to the case that the above problem in association with FIG. 5 is not caused. Therefore, in the present document, this case is assumed as not corresponding to 'the case that the HARQ feedback information reception of the terminal is impossible due to the coincidence between the measurement gap and the HARQ feedback information reception timing'.

In the following description, explained is a configuration of a terminal, which implements the above-described HARQ processing method, and more particular, an operating method by regarding non-received HARQ feedback information as HARQ ACK in case that a terminal is unable to receive the HARQ feedback information due to the coincidence between a measurement gap and an HARQ feedback information reception timing.

Figure 9:
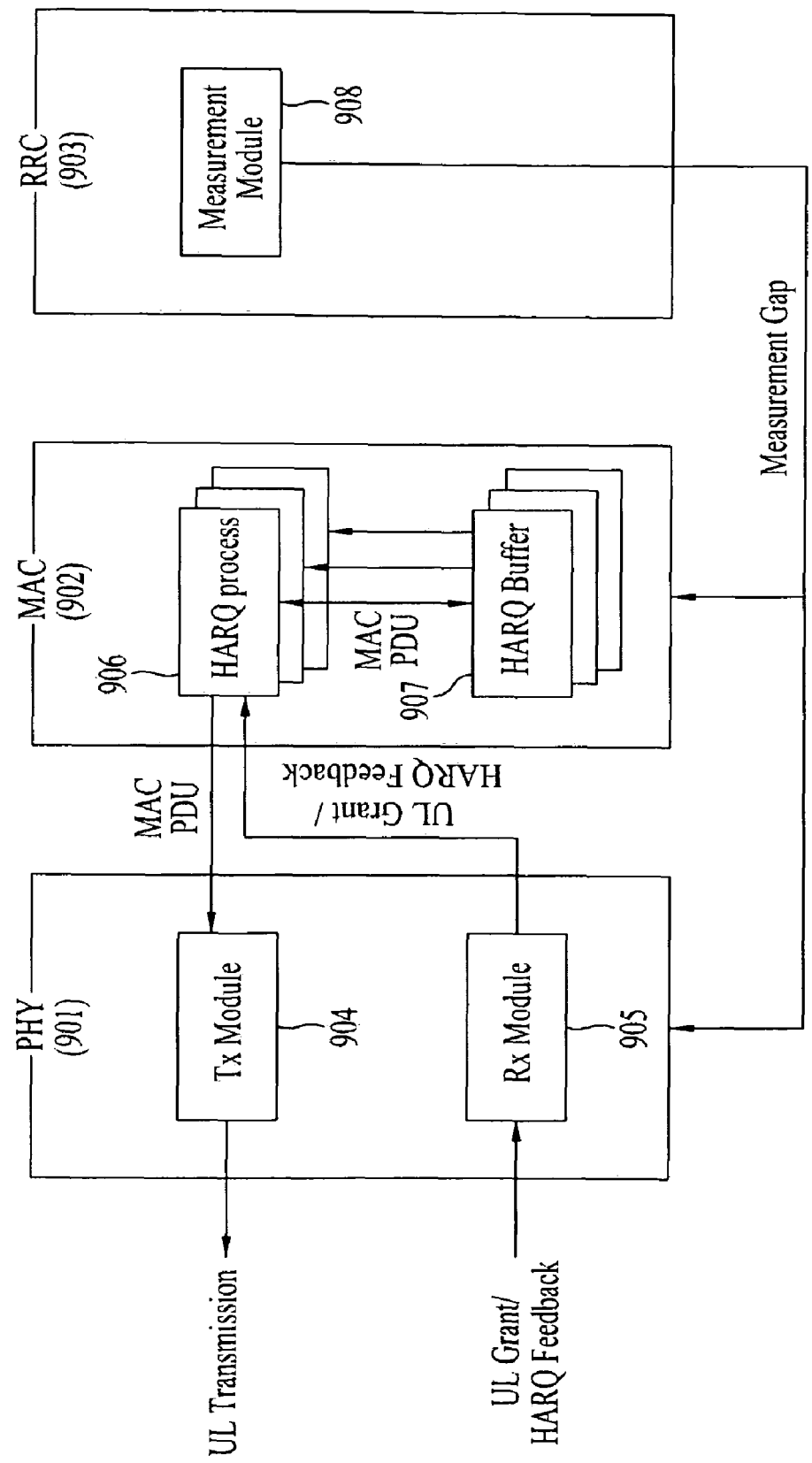
FIG. 9 is a schematic diagram of a configuration of a terminal for performing an HARQ operation according to one embodiment of the present invention.

FIG. 9 is a schematic diagram of a configuration of a terminal for performing an HARQ operation according to one embodiment of the present invention.

Referring to FIG. 9, a terminal according to one embodiment of the present invention includes a physical layer module 901 having a transmitting module 904 and a receiving module 905, a MAC layer module 902 having at least one HARQ process module 906 managing HARQ operation of the terminal and an HARQ buffer 907 corresponding to the at least one HARQ process module 906, and an RRC layer module 903 having a measurement module 908 performing an measurement operation instead of performing uplink/downlink transmission in a prescribed measurement gap. In the FIG. 9, the measurement module 908 is shown as a RRC layer module, the measurement module 908 may have another module (now shown) in the physical layer module 901 for performing the operation related to the measurement. However, the substantial management of the measurement operation is performed by the RRC layer, thus let's assume that the measurement module 908 is located in the RRC layer module 903, as shown in FIG. 9.

Based on the above configuration, HARQ operation of a terminal according to one embodiment of the present invention is explained as follows.

First of all, the terminal is able to receive UL grant information via the receiving module 905 from a base station. The received UL grant information is delivered to the MAC layer module to assign the corresponding HARQ process module 906. In this case, the HARQ process module 906 generates MAC PDU corresponding to the received UL grant and is then able to store it in the corresponding HARQ buffer 907. It is able to use the stored MAC PDU for an initial transmission or retransmission. In particular, the generated MAC PDU is delivered to the transmitting module 904 of the physical layer module 901 and is then transmitted to the base station on PUSCH. Therefore, HARQ feedback information transmitted by the base station is received again by the receiving module 905 and is then able to be fed back to the corresponding HARQ process module 906.

Meanwhile, a measurement gap for an inter-measurement can be set in the terminal through RRC layer signaling from the base station. In particular, the measurement module 908 within the RRC layer module 903 is able to perform an inter-measurement operation according to an RRC signal from the base station. In this case, the measurement module 908 is able to deliver information on a measurement gap for interrupting the uplink/downlink transmission and reception to the MAC layer module 902 and/or the physical layer module 901.

Thus, since the measurement gap for the measurement module 908 to perform the inter-measurement operation is overlapped with the HARQ feedback information reception timing for a specific uplink transmission, if the receiving module 905 of the terminal is unable to receive the corresponding HARQ feedback information, the corresponding HARQ process module 906 regards the non-received HARQ feedback information as HARQ ACK and then performs a next HARQ operation. Even if the HARQ feedback information failing to be received by the HARQ process module 906 is regarded as HARQ ACK, the MAC PDU keeps being stored in the HARQ buffer 907. If a new UL grant is received from the base station via the receiving module 905 and is then delivered to the HARQ process module 906, the HARQ process module 906 is able to retransmit the corresponding MAC PDU via the transmitting module 904 according to the newly-received UL grant.

The above-described HARQ process technology and terminal configuration thereof are explained mainly with reference to the example that they are applied to the 3GPP LTE system. Further, they are applicable to various mobile communication systems having the similar HARQ operation process as well as to the 3GPP LTE system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for a HARQ (hybrid automatic repeat request) operation processed by a terminal in a mobile communication system, the method comprising:
   receiving an uplink grant signal from a base station;
   transmitting a specific uplink signal to the base station based on the uplink grant signal;
   determining whether there is a measurement gap for the terminal not to perform at least one of uplink and downlink communications at a timing of receiving feedback information for the specific uplink signal transmission from the base station, wherein the feedback information comprises acknowledgement (ACK) and non-acknowledgement (NACK) for the specific uplink signal transmission; and
   setting the feedback information to the ACK when the measurement gap is set at the timing of receiving the feedback information and thus whereby the transmission of the feedback information from the base station is not scheduled at the timing as the result of the determination.

2. The method of claim 1, wherein the terminal keeps the specific uplink signal in a HARQ buffer, even when the terminal sets the feedback information to the ACK.

3. The method of claim 2, further comprising:
   receiving an additional uplink grant signal for the specific uplink signal from the base station; and
   retransmitting the specific uplink signal which has been kept in the HARQ buffer from the terminal.

4. The method of claim 1, further comprising:
   performing at least one of an intra-frequency measurement, an inter-frequency measurement and an inter-RAT mobility measurement during the measurement gap.

5. The method of claim 1, wherein the HARQ operation is a synchronous HARQ operation.

6. A terminal to perform a HARQ (hybrid automatic repeat request) operation in a mobile communication system, the terminal comprising:
   a receiving module receiving an uplink grant signal from a base station;
   a transmitting module transmitting an uplink signal to the base station based on the uplink grant signal;
   a measurement module performing a measurement operation and not performing at least one of uplink and downlink communications during a prescribed measurement gap; and
   at least one HARQ process module configured to manage the HARQ operation of the terminal,
   wherein the at least one HARQ process module is configured to determine whether a measurement gap is set at a timing of receiving feedback information for a specific uplink signal transmission from the base station and to set the feedback information to an acknowledgement (ACK) for the specific uplink signal transmission, when the measurement gap is set at the timing of receiving the feedback information and thus the transmission of the feedback information from the base station is not scheduled at the timing as the result of the determination, wherein the feedback information comprises the ACK and a non-acknowledgement (NACK) for the specific uplink signal transmission.

7. The terminal of claim 6, wherein each of the at least one HARQ process module is associated with a HARQ buffer, and
   wherein when a specific HARQ process module among the at least one HARQ process module sets the feedback information to the ACK, the specific HARQ process module is configured to keep the specific uplink signal in a specific HARQ buffer associated with the specific HARQ process module.

8. The terminal of claim 7, wherein when the receiving module receives an additional uplink grant signal for the specific uplink signal from the base station, the specific HARQ process module is configured to retransmit the specific uplink signal which has been kept in the specific HARQ buffer via the transmitting module.

9. The terminal of claim 6, wherein the measurement module is configured to perform at least one of an intra-frequency measurement, an inter-frequency measurement and an inter-RAT mobility measurement during the measurement gap.

10. The terminal of claim 6, wherein the transmitting module and the receiving module are included in a physical layer module, wherein the at least one HARQ process module is included in a MAC (medium access control) layer module, and
    wherein the measurement module comprises at least one of a module in an RRC (radio resource control) layer module and a module in the physical layer module.

11. The terminal of claim 6, wherein the HARQ operation is a synchronous HARQ operation.

* * * * *